United States Patent

[11] 3,554,357

[72] Inventors Desmond Walter Molins;
 Tom Rowlands, London, England
[21] Appl. No. 689,199
[22] Filed Dec. 8, 1967
[45] Patented Jan. 12, 1971
[73] Assignee Molins Machine Company Limited
 a corporation of Great Britain
[32] Priority Dec. 12, 1966, Mar. 15, 1967
[33] Great Britain
[31] 55562/66 and 12195/67

[54] MECHANICAL HANDLING APPARATUS
 27 Claims, 19 Drawing Figs.

[52] U.S. Cl. .................................................... 198/85,
 198/19; 104/89
[51] Int. Cl. .................................................... B23q 5/22,
 B61b 3/00
[50] Field of Search............................................ 198/985,
 19; 214/89, 16.14F; 104/89; 198/177, 38

[56] References Cited
 UNITED STATES PATENTS
 2,821,146 1/1958 Mahrle .......................... 104/89

Primary Examiner—Richard E. Aegerter
Attorney—Craig, Antonelli, Stewart and Hill ABSTRACT: A conveyor system for transferring cigarettes in trays from tray-fillers supplied by cigarette-making machines to tray-unloaders supplying cigarette-packing machines and for returning empty trays to the tray-fillers having an endless continuously moving overhead conveyor track carrying a series of hoists for supporting carriers for the trays, wherein the forward and return reaches of the conveyor are interconnected by cross-conveyors to enable any empty trays in the forward reach to be transferred to the return reach and any filled trays in the return reach to be transferred to the forward reach. The tray loads of cigarettes are handled by various means for exchanging the trays between an overhead continuously moving conveyor and stations where the trays are filled and unloaded which means includes hooks to support the trays on the conveyor in carriers which hooks are automatically released by movement of the carriers off the conveyor and secured by movement of the carriers back to the conveyor.

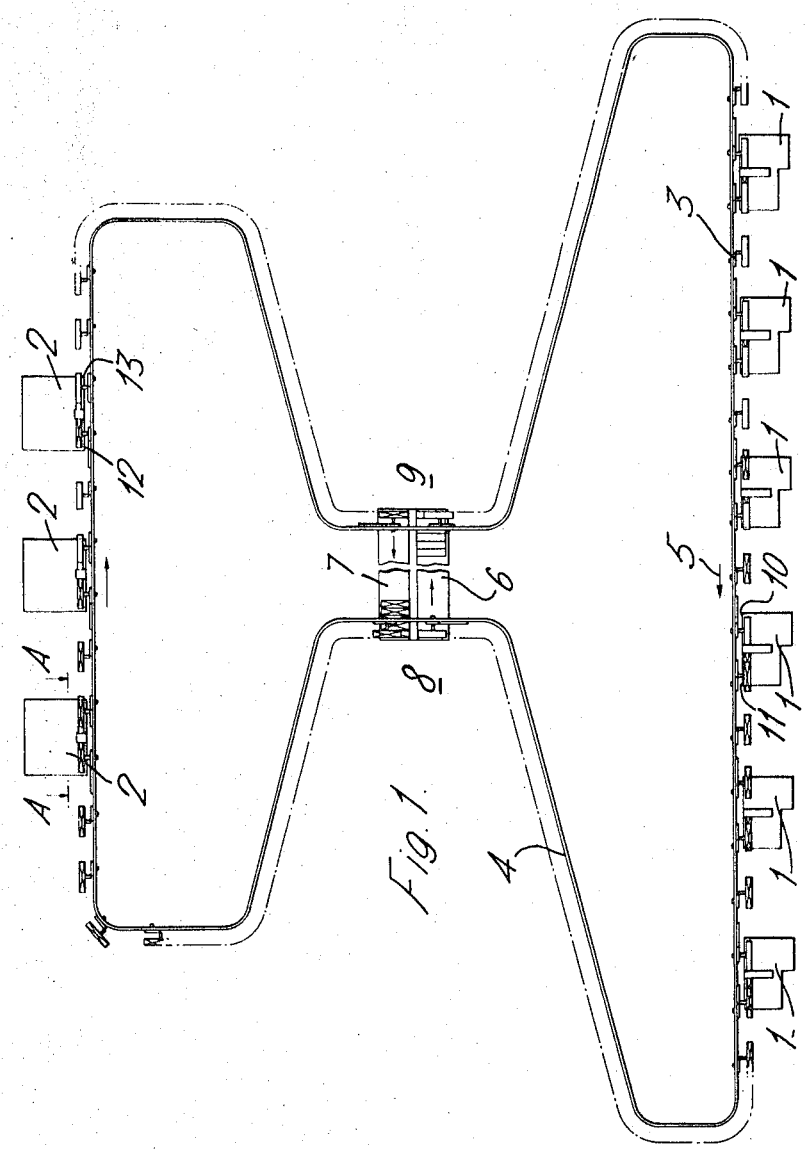

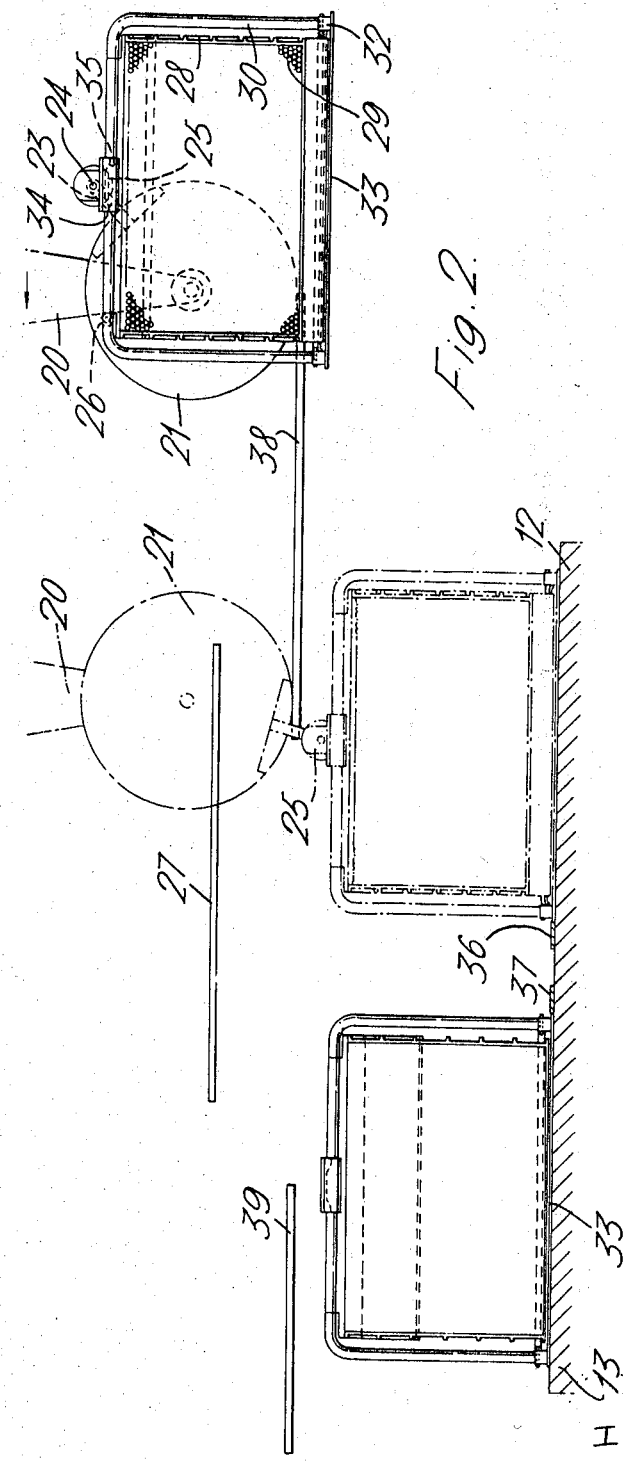

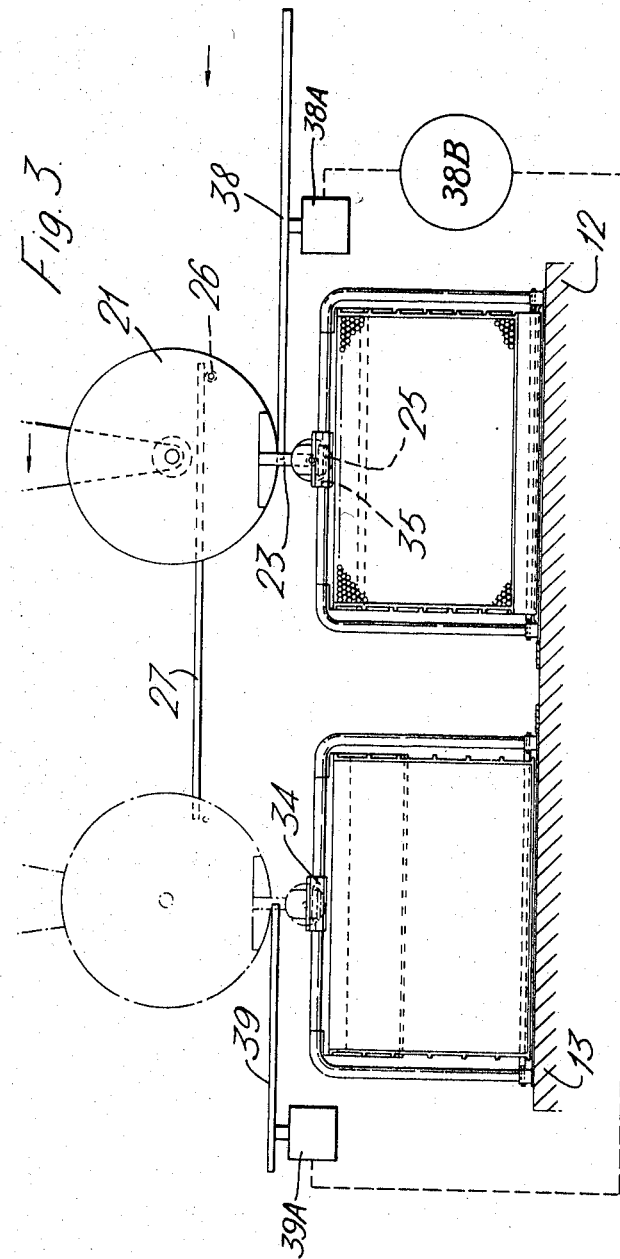

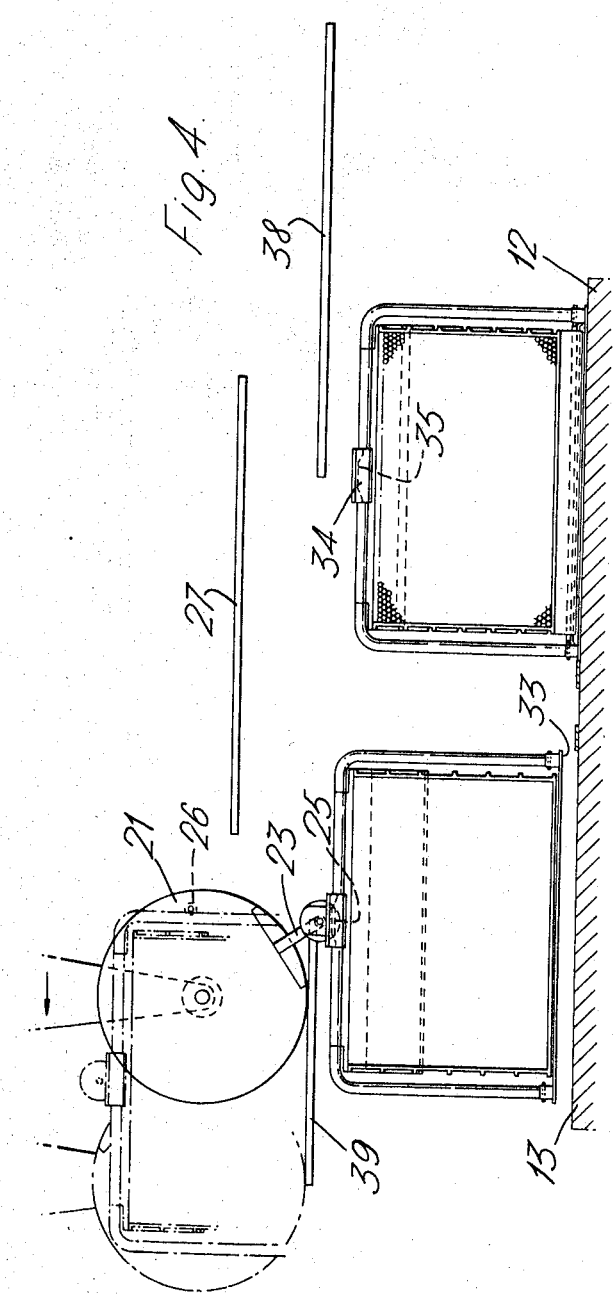

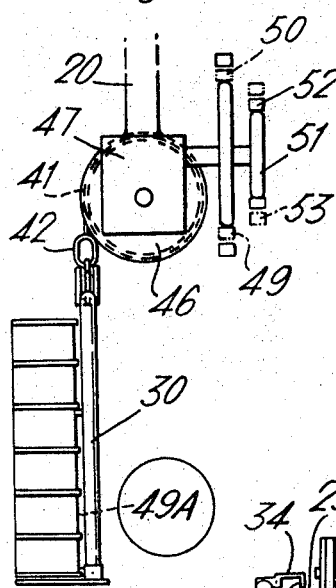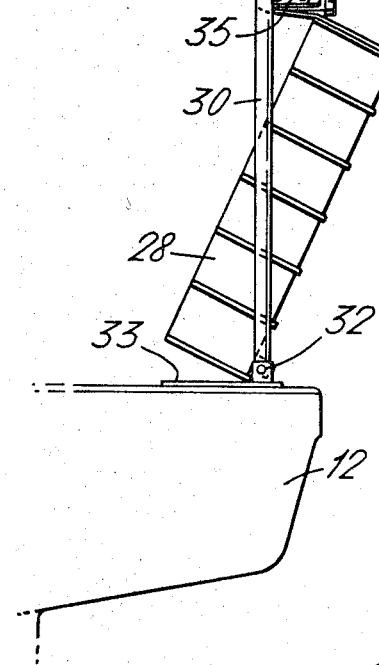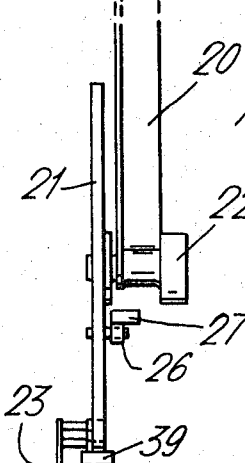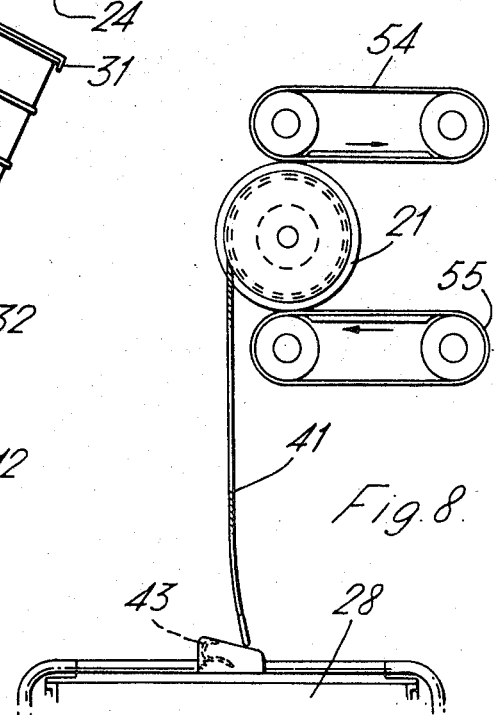

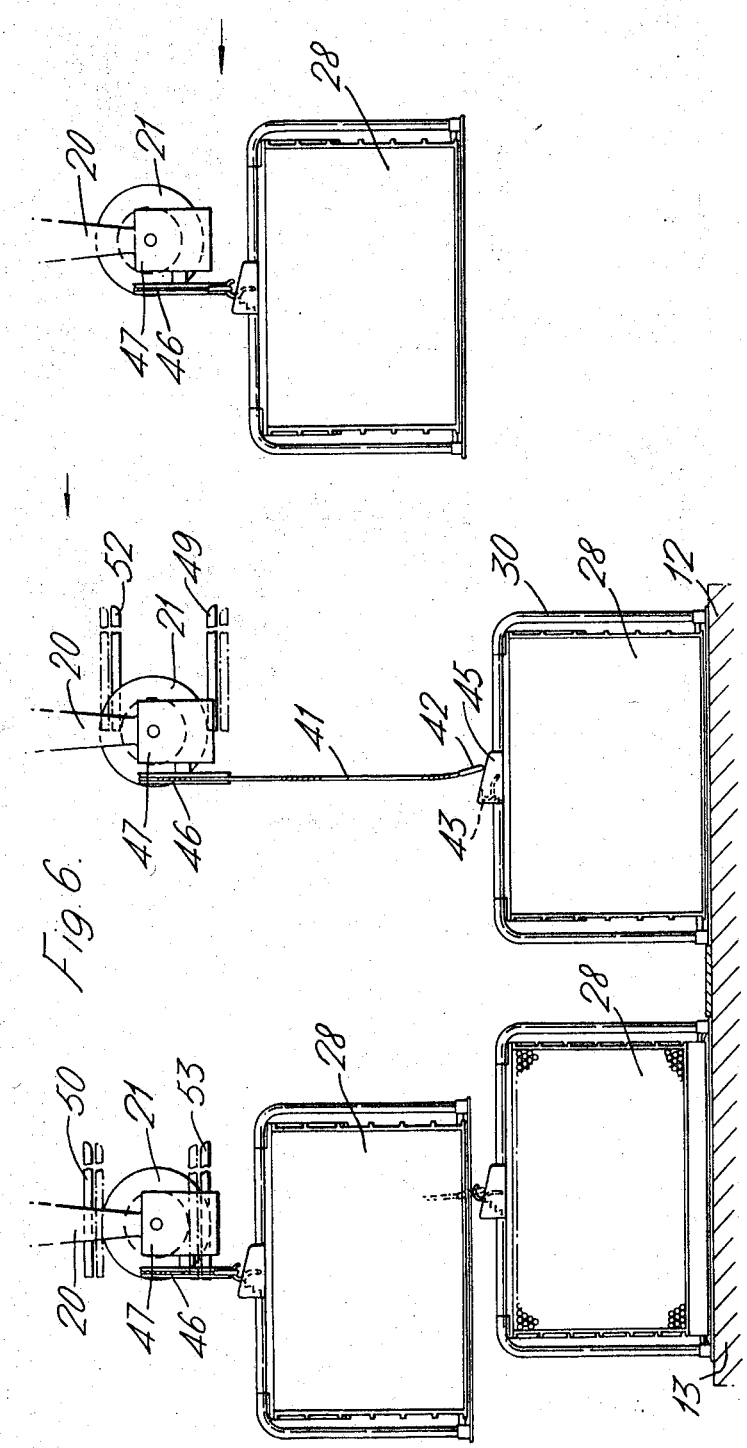

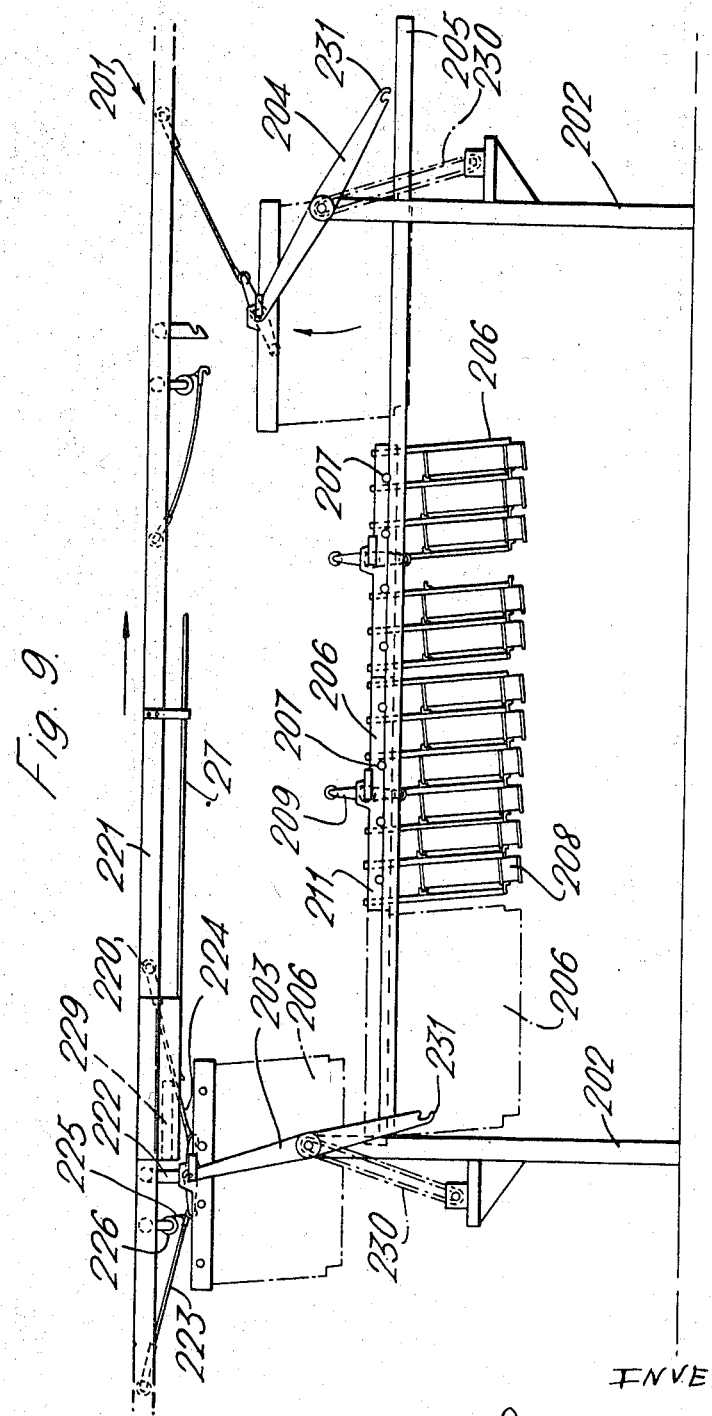

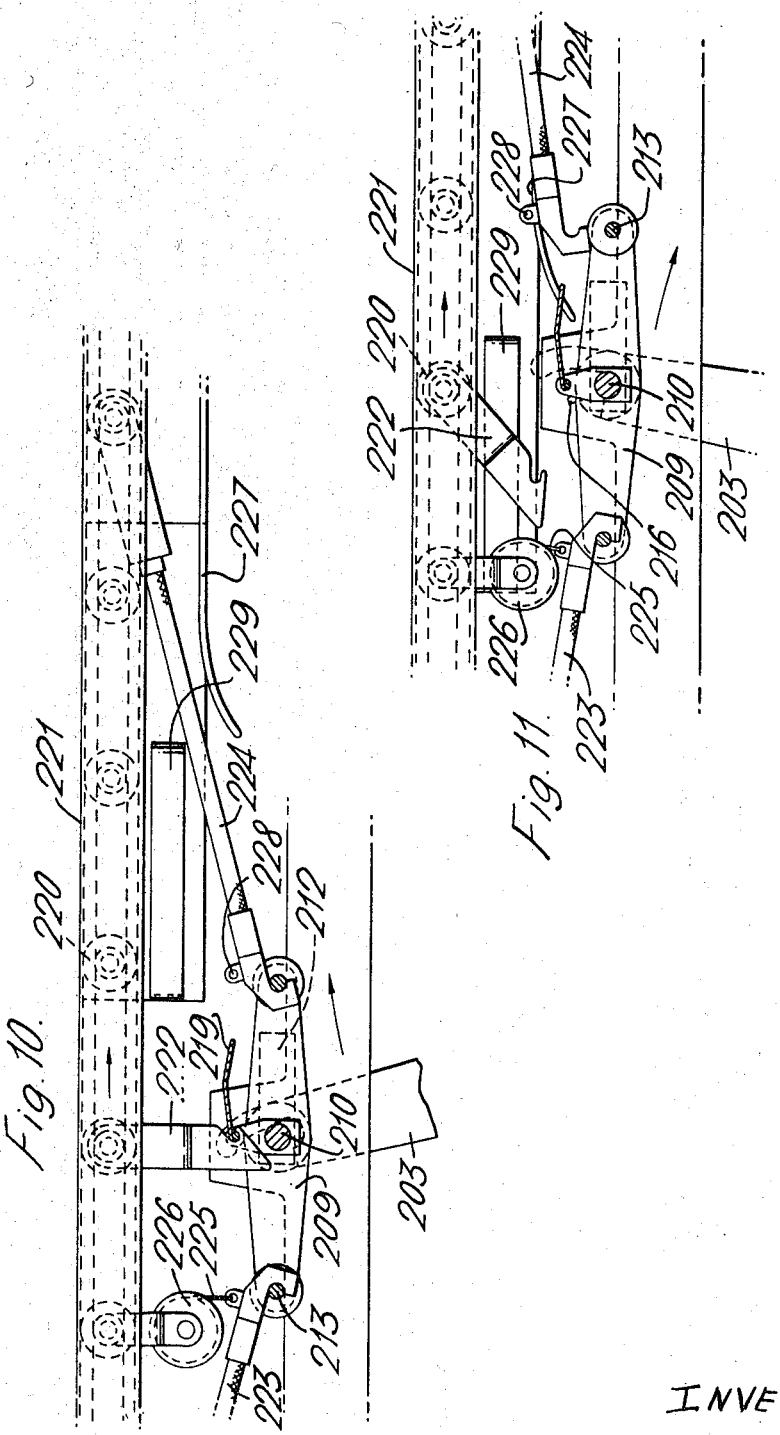

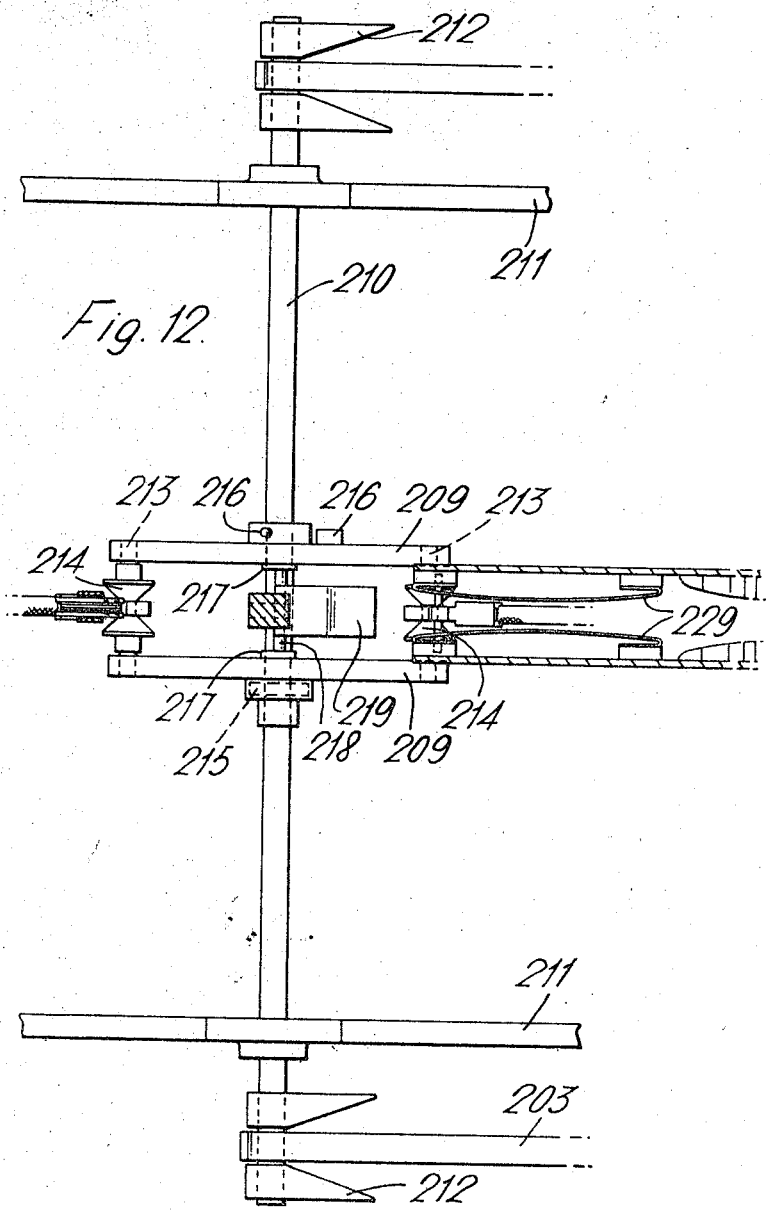

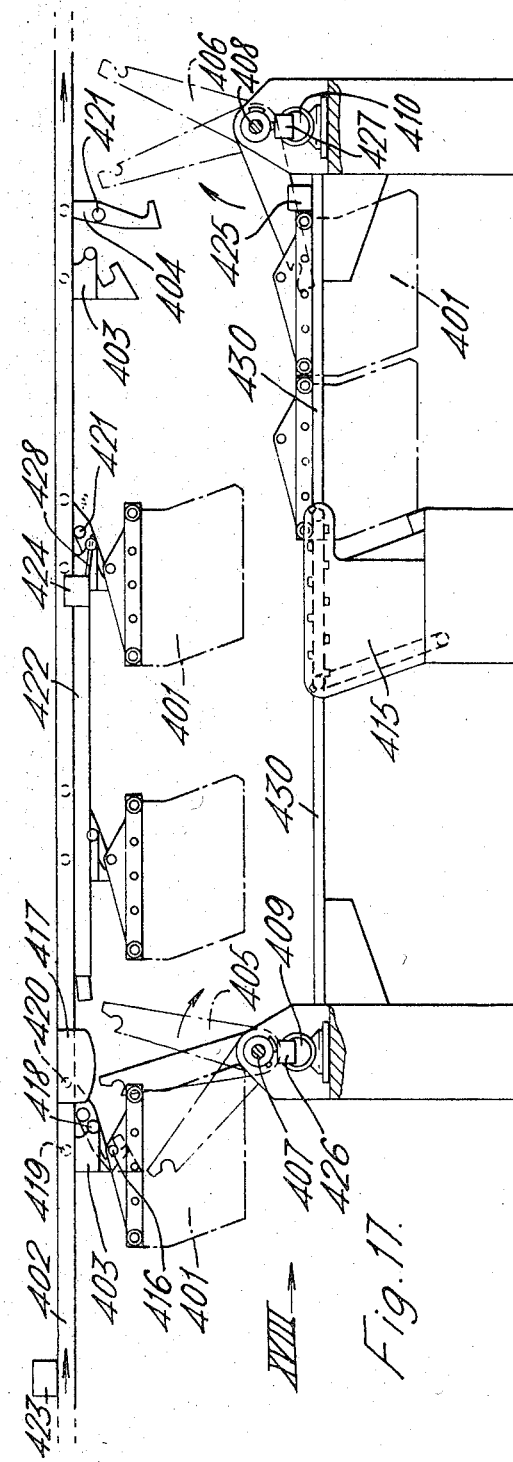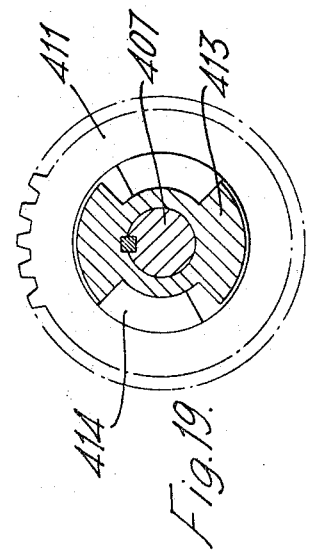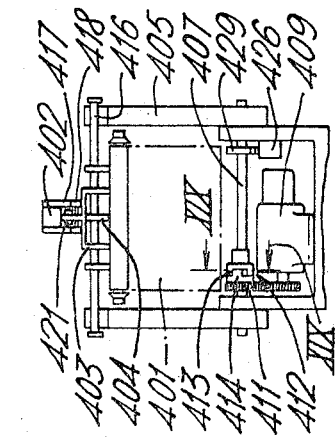

MECHANICAL HANDLING APPARATUS

This invention relates to an improved conveyor system and to improvements in mechanical handling apparatus and is particularly, although not exclusively concerned with providing apparatus which is of assistance in overcoming the problems that arise in cigarette factories in transferring large quantities of cigarettes from making machines to packing machines.

One way of doing this is by providing a conveyor rail along a continuous closed path between stations at which the makers and packers are respectively located, a set of trays for the cigarettes which are filled at the making station and emptied at the packing station, and a number of tray-supporting hoists travelling continuously and cyclically round the rail from one station to the other and back again, taking up and setting down trays according to the demands of the machines. In this way cigarettes can be carried in the trays from the makers to the packers and the trays can be returned. So long as the rates of operation of the two types of machine are matched so that the conveyor system is receiving and discharging the same numbers of cigarettes this system works satisfactorily. However, in practice it is not possible to control the operation of the makers and packers sufficiently to achieve this, since for one reason or another machines frequently slow down or have to be stopped. In these circumstances the equilibrium of the conveyor system is destroyed, and it becomes cluttered up with full trays if the packers are at fault and may eventually choke itself so that no cigarettes are transferred; or if the making machines are at fault, an excess of empty trays is carried round the system and the packing machines may be starved of cigarettes. In order to make full use of the conveyor system's capacity and to keep the tray-fillers and emptiers running smoothly, it is necessary for a hoist, as required, to set down a tray or batch of trays at the input platform of one of the stations and to pick up a tray or trays from the output platform of the same station while still travelling at a constant speed along the conveyor rail.

It is an object of this invention to provide an improved conveyor system for conveying goods from a loading to an unloading station which can cope with some difference in the rates of supply of and demand for the goods.

It is a further object of this invention to provide an improved mechanical handling apparatus which can be used to facilitate the exchange of carriers between a continuously moving hoist and a station positioned therebelow.

According to one aspect of the present invention there is provided a conveyor system comprising an endless conveyor extending between a goods-loading station and a goods-unloading station and having a forward reach for the transmission of goods-laden containers from the loading station to the unloading station and a return reach for the transmission of empty containers in the opposite direction, and comprising interchange means interconnecting the two reaches to enable goods-laden containers in the return reach to bypass the loading station and be conveyed to the forward reach and to enable empty containers in the forward reach to bypass the unloading station and be conveyed to the return reach.

Preferably the interchange means is capable of storing containers and preferably also it comprises a first transfer station at the forward reach having on-loading means to receive laden containers from the conveyor and having off-loading means for the discharge of empty containers to the conveyor, a second transfer station at the return reach having on-loading means to receive empty containers from the conveyor and off-loading means.

The system can also comprise carriers for the goods having coding means, means to set the coding means according to the nature of the goods at the goods-loading stations and means to select the carriers according to their coding at the goods-unloading stations. Preferably the conveyor comprises a number of hoists for supporting carriers for the goods travelling continuously along an overhead closed path, and each on-loading and off-loading station has an input and an output point disposed beneath the conveyor and spaced therealong, and has a receiving device and an elevating transfer device respectively to assist in lowering carriers from the conveyor to the station and in raising them from the station to the conveyor.

Another aspect of the invention lies in providing mechanical handling apparatus in which loaded and unloaded carriers are exchanged between a hoist travelling continuously along an overhead conveyor, and a handling station having an input point and an output point for the carriers positioned below the line of travel of the hoist and spaced therealong, comprising means to lower and raise the carriers between the hoist and the handling station and releasable securing means to secure a carrier to the hoist for transit along the conveyor, wherein operation of the means to lower a carrier from the hoist acts to release the securing means and operation of the means to raise the carrier to the hoist acts to secure the securing means.

Preferably securing means comprises a coupling having a hoist part and a carrier part, wherein in the secured position, with the carrier suspended beneath the hoist, the carrier is held against downward movement or horizontal movement away from the hoist, and can be released by imparting upward movement to the carrier part relatively to the hoist part and wherein in a released position the coupling can be locked together by imparting to the coupling parts a relative horizontal movement towards one another so that they engage.

The means to raise and lower the carriers can derive its notion from the momentum of the hoist along the conveyor. One way of arranging this is to mount a friction wheel on the hoist and to position came in appropriate places relative to the handling stations to engage the wheel and cause it to rotate as the hoist advances along the conveyor and to provide mechanism to connect the friction wheel to the carrier. This connecting mechanism could include a member secured to the friction wheel to rotate therewith and supporting the hoist part of said releasable coupling. Alternatively the wheel could be connected to a winch, the hoist part of said releasable coupling being carried on a line wound on the winch.

An advantage of using a friction wheel in this way is that the magnitude, timing and direction of the raising and lowering movements can readily be controlled by relation of the dimensions and positioning of the cams.

The invention can further comprise a transfer device arranged to support the carrier and to pivot about an axis transverse to the conveyor for the purpose of guiding the carrier in its movement between the conveyor and the station.

The station may be provided with two such transfer devices one to operate between the conveyor and the input point and the other to operate between the conveyor and the output point.

On the one hand the transfer device can comprise a friction disc mounted on the hoist for rotation, cams being provided to effect appropriate rotation of the disc, and wherein the carrier is supported in such a way as to move with the disc about its center of rotation as it is transferred between the conveyor and the station. The cams can be arranged to be settable for engagement with the disc according to whether or not carrier exchange is required.

On the other hand the transfer device can comprise transfer members mounted for pivotal movement about a point which is stationary relative to the hoist and is provided with means to engage a carrier supported on a hoist.

Preferably the arrangement is such that the act of setting a carrier down at the input point causes a carrier to engage with transfer members at the output point.

Some embodiments of the invention will now be described, by way of example, with reference to the accompanying drawings, in which:

FIG. 1 is a plan view of the conveyor system for transporting cigarettes from cigarette-making machines to cigarette-packing machines;

FIGS. 2 to 4 are side views at successive intervals of time on the line A—A of FIG. 1 showing one form of travelling hoist;

FIG. 5 is an end view of the apparatus shown in FIG. 2;

FIG. 6 is a view similar to FIGS. 2 to 4 showing another form of travelling hoist;

FIG. 7 is an end view of the apparatus shown in FIG. 6;

FIG. 8 shows a modification of a part of the apparatus of FIG. 6;

FIG. 9 is a side elevation view, at a loading unloading station of another form of a cigarette conveyor system in which the cigarettes are conveyed in trays carried in baskets;

FIGS. 10 and 11 are details to a larger scale of a part of FIG. 9 in successive positions in the sequence of operation of the station;

FIG. 12 is a plan view of the upper part of a basket transported by the system of FIG. 9;

FIG. 17 is a side elevation of a loading and unloading station of a further form of basket conveyor system;

FIG. 18 is a view in the direction of the arrow XVIII of FIG. 17; and

FIG. 19 is a section on the line XIX–XIX of FIG. 18.

Figure 13:
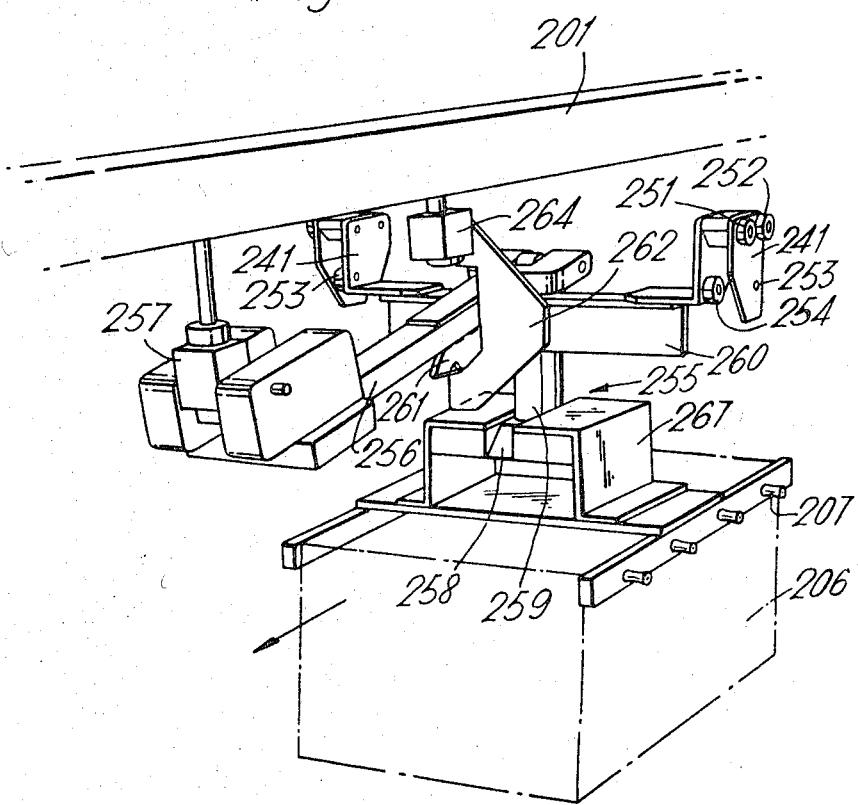
FIG. 13 is a perspective view of another basket conveyor system showing one basket suspended from a conveyor.

Referring to FIG. 1, there is shown a conveyor system for transporting cigarettes in batches from a loading station having a plurality of automatic tray-fillers 1, which are continuously supplied with cigarettes by cigarette-making machines, to an unloading station having a plurality of automatic tray-emptiers 2 which supply cigarettes continuously to cigarette-packing machines. The system comprises a number of travelling hoists 3 for the trays and a continuously movable overhead chain conveyor including rail 4 from which the hoists 3 depend and along which they travel in the direction indicated by the arrow, and which extends along a loop having roughly the configuration of an hourglass, the loading and unloading stations lying one alongside each bulbous portion thereof. Across the constriction of this loop, where the forward and return reaches of the conveyor rail 4 which extend between the stations are close to one another, there is disposed a tray interchanger comprising a pair of horizontal moving-belt cross-conveyors 6 and 7 moving in opposite directions and communicating with the conveyor rail 4 by way of transfer-stations 8 and 9. Cross-conveyor 6 moves empty trays deposited at station 8 back to the return reach for recirculation through the loading station; conversely cross-conveyor 7 moves filled trays deposited at station 9 across to the forward reach to be returned to the unloading station. In each case trays, either filled or unfilled as the case may be, that are temporarily unwanted are stored in line along the respective cross-conveyor, being held in position thereon by locating means, the conveyor band slipping under the trays.

Each automatic tray-filler 1 has an off-loading platform such as 10 for empty trays and downstream thereof an on-loading platform such as 11 for filled trays, and additionally comprises a hopper into which cigarettes are fed by a cigarette-making machine and a filling mechanism which charges empty trays from the off-loading platform 10 with cigarettes and moves the filled trays on the the on-loading platform 11.

Each tray-emptier performs an opposite function, having an off-loading platform 12 for filled trays and downstream thereof an on-loading platform 13 for empty trays, and comprising an emptying mechanism to discharge cigarettes from the trays on the off-loading platform 12 into the hopper of a packing machine and to move the emptied trays on to the on-loading platform 13.

The travelling tray-hoists 3 coact with means provided at each station, in a manner to described in detail hereinafter, to set down one or more trays of one type, i.e. filled or unfilled, at the off-loading platform and to pick up the same number of trays of the other type from the on-loading platform. Each of the transfer stations 8 and 9 and each tray-filler 1 and emptier 2 is provided with means to detect the nature of the trays offered by a hoist so that they may be accepted or refused accordingly. The detection can be assisted by coding the trays according to whether they are full or empty. One way of doing this is by using a photoelectric detector and aperturing a wall of each tray to be alignable with the detector and to be obturated by cigarettes when the tray is full. Also the means to coact with the travelling hoists are arranged to be selectively movable into and out of an operative position according to whether or not tray exchange is required.

The system can be used for conveying more than one brand of cigarettes at the same time. Certain makers and packers are allotted to each brand and at each off-loading platform 12 of the unloading station a detector for selecting the allotted brand is provided. In practice the trays are coded to cooperate with the brand-detectors, and to assist in brand selection, the code being applied or set by each tray-filler 1 at the loading station possibly on the trays themselves.

The tray-fillers 1 and the tray-emptiers 2 are each provided with a certain number of trays in magazines at the off- and on-loading platforms and since the travelling hoists 3 always exchange trays, never leaving one without picking up another, this number remains constant throughout the running of the system, although the distribution between the magazines of a pair will change with fluctuations in the rates of packing and making. Since the packing machines operate faster than the makers it is preferable for the tray-emptiers to have more trays than the tray-fillers. Similarly the tray interchanger is also provided with a certain number of trays which does not vary during the running of the system, although the distribution between the cross-conveyors 6 and 7 does vary. The trays stored in the interchanger constitute a float and their number determines the size of the float and the amount of unbalance between packing and making which the system can absorb. The number of trays of each brand on the filled-tray conveyor 7 provides an indication of the difference in the making and packing rates for that brand and can be used to alter these rates to reduce the difference between them.

Each travelling hoist 3 is provided with a tray or a set of trays and, again because of the tray exchange, it always carries a tray except in the very short travel between on off- and an on-loading platform.

During normal running of the system, under theoretically perfect conditions where the total rate of making each brand is equal to the total rate of packing that brand, the travelling hoists 3 are moved along the rail 4 at a rate equal to the packing and making rates and no exchange of trays takes place at the interchanger, the number of trays in each cross-conveyor store remaining constant. If a packer slows down, or stops, then the next tray-load of cigarettes designated for that packer is not unloaded but carries on to the transfer station 9 where since it is a full and not an empty tray, exchange takes place and it is set down on the cross-conveyor 7 and deposited in the store at transfer station 8, an empty tray being picked up by the hoist from the store on cross-conveyor 6. Thus the amount by which the number of cigarettes made exceeds the number of cigarettes packed is reflected in an increase in the number of filled trays on the cross-conveyor 7. In a similar way if a maker slows down or stops the next empty tray intended for that maker passes on to the transfer station and, since it is an empty and not a full tray, it is exchanged for a filled tray, thus altering the relative number of trays in the cross-conveyors 6 and 7. Thus the amount by which the number of cigarettes packed exceeds the number of cigarettes made is reflected in an increase in the number of empty trays on the cross-conveyor 6. It will be appreciated that at startup it is necessary to provide some full trays on the conveyor 7 so that the system can absorb delays from the cigarette-making machines.

Conveniently each tray-filler 1 and emptier 2 has a control device whereby it operates to exchange trays whenever the number of trays in its output magazine exceeds a certain value. The tray emptier control devices are preferably variable so that the startup can be graduated to avoid filling the packers successively rather than simultaneously.

Referring now to FIGS. 2 to 5 one form of the travelling hoist 3 comprises a hanger 20 which depends from and runs along the conveyor rail 4 and a support disc 21 rotatably secured to the end thereof by means of a pawl and ratchet mechanism 22 which allows the disc to rotate only in an anticlockwise direction. A bracket 23 is mounted to extend radially from the periphery of the disc 21 and carries a spacer shaft 24 to which a lifting hook 25 is pivoted. Behind the disc a rotatable roller 26 is mounted for engagement with a horizontal guide 27.

Each tray 28 is open at the front and the top and cigarettes 29 are stacked in the trays in rows. A carrier 30 supports the tray 28 on a cant to prevent cigarettes falling out by means of a bracket 31 and a hinge 32, and a base plate 33 on which the tray can be supported to stand on a flat surface. The upper part of the framework 30 carries a lifting element 34 having the form of an inverted channel and having a recess 35 formed in its outer limb to receive the hook 25 for the tray to be supported thereon and located against sideways movement. In supporting trays the hook 25 swings about shaft 24 so that the tray always hangs vertically.

In FIGS. 2 to 5 the trays are shown in relationship to platforms 12 and 13 of one of the automatic tray-emptiers 2 and these platforms are provided with stops 36 and 37 engaging the base plate 33 to align the trays on the platform. The trays standing on the platforms in FIGS. 2 to 4 are the end ones of rows of trays in the input and output magazines of the tray-emptier. Cam rails 38 and 39 are disposed above the platforms 12 and 13 to engage and rotate disc 21 to effect tray exchange, and are movable by means of operating devices 38A and 39A (shown diagrammatically only in FIG. 3) into and out of the operative positions in which they are shown in response to a cigarette brand detector 38B and to the demands of the packer which the tray-emptier feeds, as indicated by the number of trays in one of the magazines.

The tray-emptier operates upon a full tray in the input magazine at platform 12 to remove the cigarettes and feed them to a packer and to transfer the tray to the output magazine of empty trays on platform 13. When more cigarettes are required cam rails 38 and 39 are moved in to operative position to engage with the disc 21 of the next tray load of the right brand of cigarettes, so that the disc 21 proceeds to roll along rail 38, rotating in an anticlockwise direction and moving the tray from the position shown on the extreme right of FIG. 2 in which it is supported on the disc against ratchet 22, to the next position in which it is free-standing on platform 12. Disc 21 continues to rotate to the end of cam rail 38 thereby lowering hook 25 to its lowermost position and taking it out of the recess 35 in the element 34, thus releasing the tray as is shown in FIG. 3. At the same time roller 26 engages under guide rail 27 and prevents disc 21 from rotating any further. The continuous linear movement of hanger 20 (along conveyor rail 4) carriers the disc along of the position shown on the left of FIG. 3 where hook 25, still in its lowermost position is aligned under recess 35 in the lifting element 34 of an empty tray and where roller 26 is just leaving guide 27 to allow the disc to resume its rotation and the disc is just engaging with cam rail 39 to effect this rotation. Continued movement along the conveyor rail rotates the disc and lifts the tray to the chainline position shown in the extreme left of FIG. 4, which is the normal travelling position.

It will be observed that in the complete exchange operation the disc 21 rotates through exactly one revolution, returning to its approach position. It will also be noted that at the moments of taking up and setting down the trays the linear component of the rotary motion of disc 21 is opposed to the linear motion of the hanger 20, thereby reducing the tendency to snatch or drag the trays along the platforms.

Referring now to FIGS. 6 to 8, in FIG. 6 there are shown four trays 28 supported in carriers 30. Three of these trays are supported on a conveyor rail (not shown) by travelling hoists whilst the fourth stands on an output platform 13 of the tray-filler, awaiting collection. Of these three, two; namely the extreme right- and left-hand ones, will pass by the tray filler, whereas the empty central right-hand tray is being exchanged by its hoist for the full central left-hand tray. The tray filler operates to fill trays received at platform 12 with cigarettes received from a cigarette-making machine and to transfer the full trays to the output platform 13.

Each travelling hoist comprises a friction disc 21, carried on a hanger 20 travelling along the conveyor rail, which engages with cam rails disposed above platforms 12 and 13 to be rotated and thereby to effect lowering of a full tray and raising of an empty one. The trays are supported on a line 41 having at one end an eye 42 for hooks 43 mounted on the carriers 30. Each hook 43 is pivoted to an upper member of the carrier 30 to face rearwardly and is loaded in an anticlockwise direction by spring 44. A pair of guide plates 45 is disposed either side of the hook 43 to lift eye 42 clear of the hook as it moves from one tray to the next. Means (not shown) are provided to raise hook 43 associated with a filled tray at station 13 to its upright position to engage with eye 42. The other end of line 41 is secured to a pulley 46 which is rotated, first one way and then the other, to pay the line out and to rewind it, by disc 21 through a one-way drive gearbox 47 which acts to prevent over-run. The gear box 47 could comprise a worm mounted to rotate with disc 21 and driving the pulley 46 through a worm wheel and a step-up gear train; alternatively it could include a ratchet mechanism. Retractable cam rails 49 and 50 are positioned above stations 12 and 13 respectively, the first below and the second above the friction disc 21, and are moved into their full line operative positions to engage the disc 21 when the tray-filler is ready to exchange trays as determined by means including a detector 49A (see FIG. 7) mounted adjacent to the path of the trays. A free-running wheel 51 (FIG. 7) is mounted on a common shaft with the friction disc 21 and coacts with cam rails 52 and 53 (also retractable) to take the sideways thrust about the conveyor rail which is produced by taking-up or setting-down of the trays.

When the tray-filler is ready to receive an empty tray in exchange for a full tray cam rails 49 and 50 are moved into their operative positions in front of the next hoist carrying an empty tray to engage the disc 21 and wheel 51 respectively of that hoist. Engagement of disc 21 with cam rail 49 causes the disc to rotate in a clockwise direction thus unwinding line 41 from pulley 46 by means of worm 47 and worm wheel 48. As the weight of the tray is taken on platform 12 so the load is taken off hook 43 and it accordingly lies down between the guide plates 45, the eye 42 being drawn along the guides clear of the hook 43 by the motion of the hoist along the conveyor. This motion brings the eye 42 into engagement with hook 43 which is upright having been raised by the previously mentioned means on the central left-hand tray of full cigarettes. At the same time disc 21 engages cam track 49 and is accordingly rotated in an anticlockwise direction thereby winding-in the line 41 on the pulley 46 and raising the full tray to the travelling position.

In the alternative arrangement shown in FIG. 8 the line 41 is wound on a drum rotating with disc 21 and endless friction conveyors 54 and 55 are provided to engage and rotate the disc.

Figure 14:
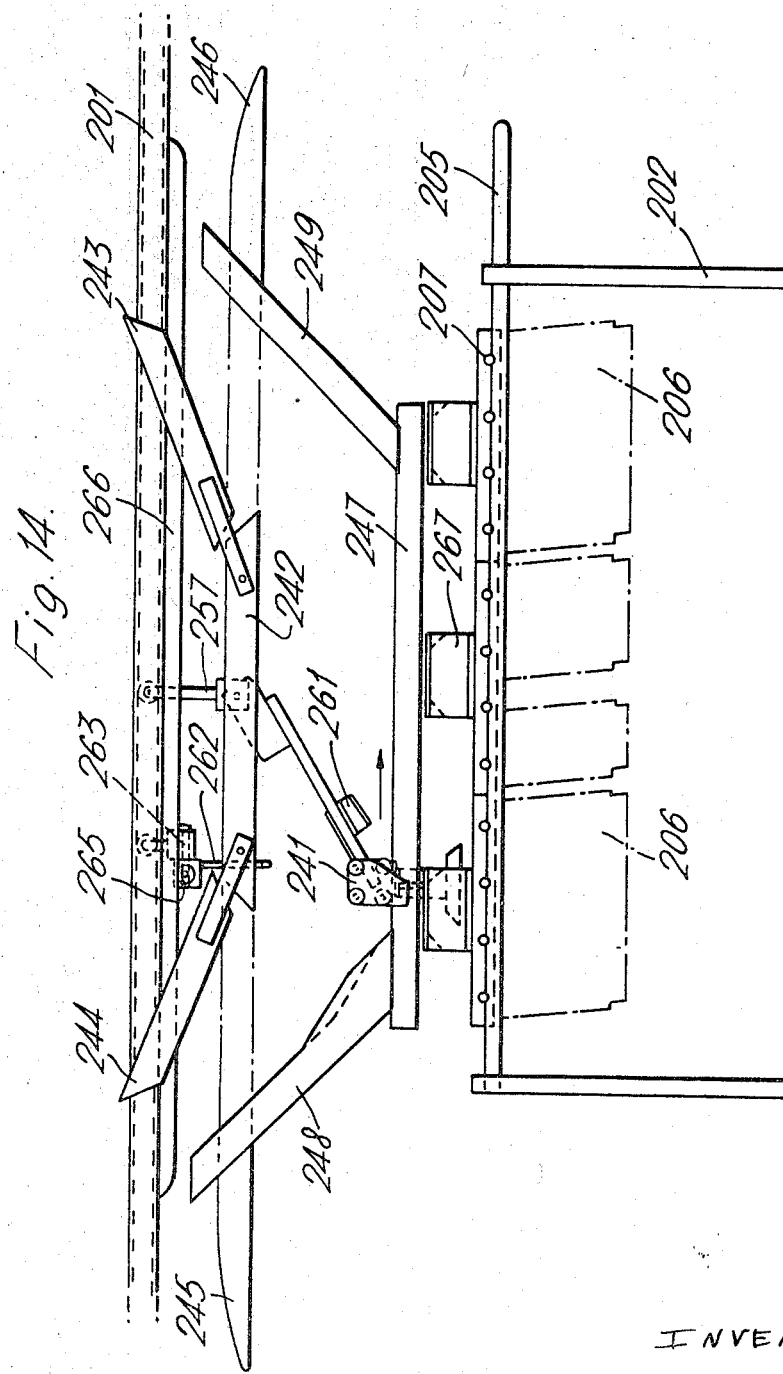
FIG. 14 is a side elevation view of the same system at a loading and unloading station.
Figure 15:
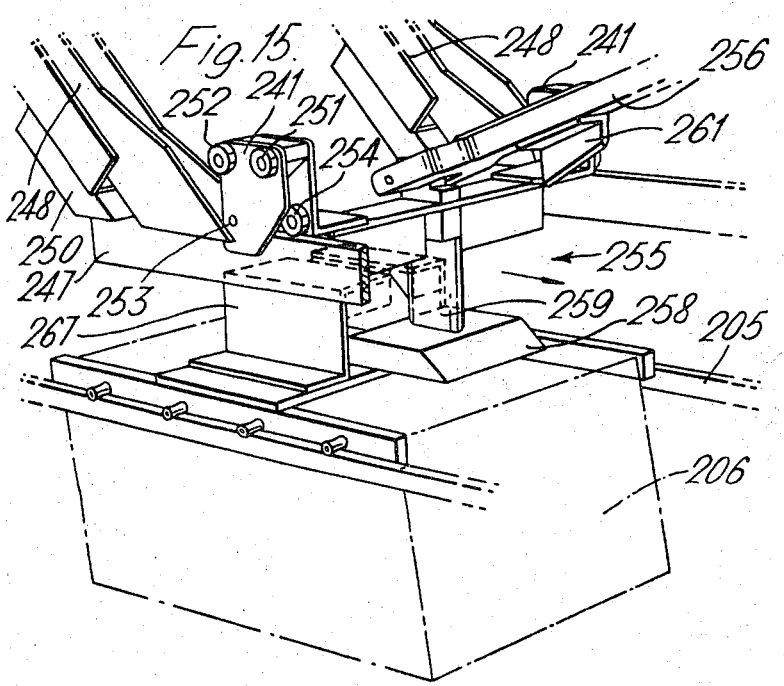
FIG. 15 is a perspective view to a larger scale of a basket being off-loaded at the station shown in FIG. 14.
Figure 16:
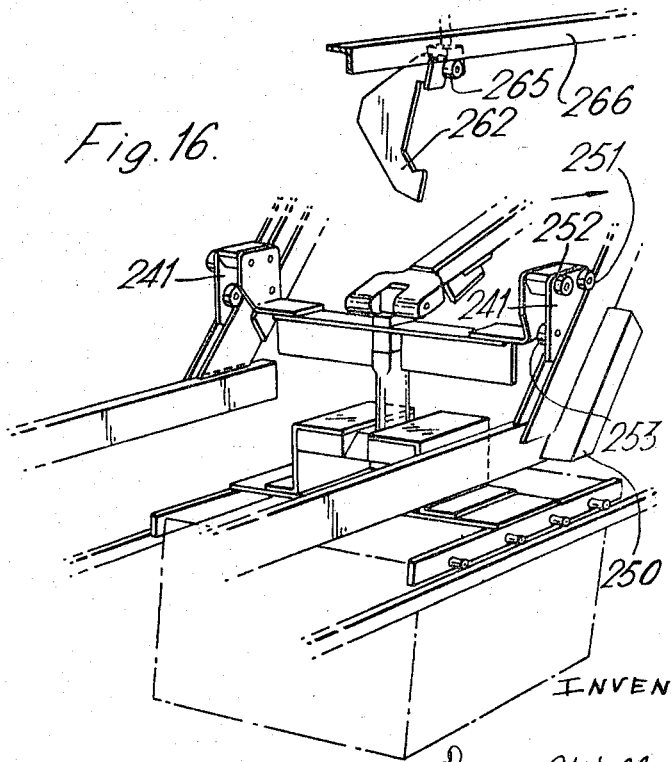
FIG. 16 is a perspective view of a basket being on-loaded to the conveyor from the station shown in FIG. 14.

In the embodiments of FIGS. 9 to 16 the trays are transported on a conveyor in baskets carrying six trays each from which baskets the trays are loaded and unloaded at the packing and making machines by mechanism which is shown in these figures of the drawings.

Referring to FIGS. 9—12 of the drawings a conveyor 201 runs along a guide track 221 extending above a station comprising support members 202 for off- and on-loading arms 203 and 204 respectively between which there extend a pair of rails 205 on which baskets 206 are supported by rollers 207 and along which they are moved, as required, by a conveyor, not shown. Each basket 206 carries six trays 208 which are supported in the baskets at a slight angle to the vertical and which are loaded into and out of the baskets by being moved endwise, that is to say, perpendicularly to the line of advance of the conveyor 201, by a further conveyor which is not shown. The baskets 206 also have a centrally mounted rotatable locking piece which comprises a pair of side plates 209 mounted on a shaft 210 which extends across the top of the basket and beyond its side walls 211 to carry at its ends guides 212 for the arms 203 and 204.

The side plates 209 are connected by means of cross struts 213 on which are mounted conelike pairs of guides 214 between which an appropriate part of the conveyor engages to support the basket. The locking piece is spring-loaded at 215 for rotation in an anticlockwise direction as viewed in FIGS. 9-—11 and this movement is checked by the abutment, one against the other, of stops 216.

Secured to the shaft 210 between the plates 209 by means of trunnions 217 is a latch bar 218 which is used to support the basket on the conveyor 201. A guide plate 219 assists in the latching.

The conveyor 201 has a number of rollers 220 running in a track 221 and to which sets of lifting gear are secured at regular intervals. The sets of lifting gear comprise a rigid support hook 222 which engages latch bar 218 and is pivoted to one of the rollers 220 midway between a pair of pivotally mounted flexible hooks 223 and 224 which engage the cross-struts 213. The trailing hook 223 is supported at its free end by a line 225 from a spring-controlled reload winch 226 carried on an intermediate rollers. A cam rail 227 is engaged by a pin 228 on the free end of the leading hook 224 to guide it over the station. A pair of spring guides 229 are positioned so as to be engaged by the support hook 222 so as to grip it and cause it to swing back, thereby assisting in unlatching it.

The loading arms 203 and 204 are controlled in their movement by way of bands 230 and so long as there are sufficient trays at the station they remain horizontal and the baskets on the conveyor bypass the station. When more trays are required the off-loading arms 203 are rotated, by the bands 230, into the nearly vertical position shown in FIG. 9 where hooks 231 on the ends of the arms are aligned with the shaft 210 on to which they hook with the assistance of guides 212, to take the weight of the basket as it moves along the conveyor. The continued movement of the basket along the conveyor brings the arms 203 into the vertical position, tending to lift the latch bar 218 out of the conveyor support hook 222, where the hook 222 comes between the spring guides 229 which hold it back and complete the unlatching. The weight of the basket is now wholly supported on the arms 203 and it is gradually lowered on to the rails 205. As it approaches this position its leading end comes into engagement with the end of the rearmost of the baskets already at the station and its further movement pushes them all along the rails 205. During the lowering the hooks 223 and 224 are successively disengaged from the central locking piece with which they cooperate during the travel along the conveyor to prevent the baskets twisting and swinging. Firstly the leading hook 224 is lifted off its strut 213 by engagement of the pin 228 with its cam 227 (FIG. 11) and then the winch 226 automatically retracts the line 225 so as to pull the trailing hook 223 out of engagement with the strut 213 of the locking piece. The spring 215 rotates the locking piece to a vertical position where the stops 216 abut one another.

Meanwhile at the on-loading end of the station the arms 204 have been positioned with their hooks 231, which face the opposite way from those of the off-loading arms 204, just above the rails 205 so that as the nearest of the baskets 206 is advanced by the conveyor referred to, so the hooks 231 engage on the shaft 210. At the same time, the pin 228 on the hook 224 having run off its cam track 227 allowing the hook to drop behind the upstanding locking piece on the leading basket, the hook 224 latches on to one of the cross struts 213 and starts to lift the basket since the hook drags the arms 204 in a clockwise direction so as to raise the ends of the arms 204 holding the basket. As the basket approaches the conveyor the support hook 222 strikes guide plate 219 and is thus caused to hook on to the latch bar 218 and then hook 223 grabs the other strut 213 as the locking piece rotates thus securing the basket on the conveyor.

In the embodiment shown in FIGS. 13 to 16 the station is provided with a superstructure on either side of the conveyor 201 which comprises two sets of tracks for a pair of roller carriages 241 which form a part of a conveyor-attached basket support mechanism and which support the basket during its passage through the station. This track superstructure has an upper, normally horizontal part comprising a fixed section 242, two movable wings 243 and 244 pivoted to the ends thereof, and two end pieces 245, 246. In addition there is a lower part comprising a horizontal part 247 running just above the rails 205 and two oppositely inclined parts 248 and 249 which connect to the upper part. Each of the horizontal tracks, 242 to 247, comprises a single rail whereas the connecting tracks, 248 and 249 comprise a double rail and have a U-shaped cross section. Supports such as 250 are provided at the junctions of the rails. The down track 248 is shaped at its lower end to ensure that the basket 206 is deposited with a minimum of disturbance, the outer rails of both the up track 249 and the down track 248 extend above the upper track to assist in the movement of the carriages 241 on to and off that track.

Each roller carriage 241 has four rollers, an upper outermost pair 251, 252, a lower center roller 253 and a lower innermost roller 254, these rollers being so disposed in relation to rails 242 to 249 as to give two point roller contact thereby maintaining that basket carrier 255 is kept on a horizontal plane at all times.

The basket support mechanism comprises a basket carrier 255 articulated to one end of a connecting arm 256 the other end of which is articulated to a support 257 depending from the conveyor 201 to which it is secured for movement therewith. The basket carrier 255 has a basket-engaging portion 258 mounted on the lower end of a stem 259 the upper part of which supports a crossbar 260 the ends of which are each provided with a roller carriage 241.

To the underside of the connecting arm 256 there is secured a latch plate 261 which is engaged by a hook 262 pivoted at 263 to a conveyor-mounted block 264 and having an extension beyond the pivot 263 which carries a roller 265 for a cam track 266.

The upper part of each basket 206 is provided with a bridge 267 underneath which the portion 258 of the basket carrier can pass and which is divided centrally to allow the stem 258 of the basket carrier to pass through the bridge. The underside of the bridge 267 is formed to receive the portion 258.

If basket exchange is required at the station the wing track 244 is raised. As a basket approaches the station the rollers 251 and 252 on the roller carriages 241 run on to the tracks 245 and the hook-mounted roller 265 runs on to the cam track 266 and is depressed pivoting the hook 262 outwards and disengaging it from the latch 261 on the arm 256 so that the weight of the basket and the basket carrier is transferred from the conveyor to the tracks 245. The upper roller 252 then runs on the to the extended outer rails of the track 248 and the roller 254 runs on to the inner rail carrying the assembly downwards. As the roller carriages 241 approach the end of the tracks 248 the rollers 207 on the basket 206 come into engagement with the rails 205 and support the basket. The final downward movement of the basket carrier disengages the portion 258 from the bridge 267 thus releasing the basket from its carrier. The continued movement of the conveyor 201 draws the roller carriages 241 along the tracks 247, the basket-engaging portion 258 running under the bridges 267 of any baskets 206 supported on the rails 205 until the rollers 251 and 253 run on to the track 249 whereupon the portion 258 is raised into the cooperating underside of the bridge 267 of the end basket thus drawing it up to the conveyor 201. As the roller carriages 241 run off the track 249 it raises wing 243 (gravity controlled), the hook-mounted roller 265 runs off cam track 266 and the hook reengages latch plate 261 thus supporting the weight of the basket on the conveyor.

The wing piece 244 has at this point already been lowered and the next baskets coming along run through the station above the baskets already there, the roller carriages going straight along the upper track 245, 244, 242, 243 and 246 instead of being diverted down to the lower track.

The embodiment shown in FIGS. 17 to 19 is generally similar to that shown in FIGS. 9 to 12, the principle difference being that in the present embodiment power means are provided for raising and lowering trays in their carriers. Baskets 401 of trays are carried along a conveyor 402, from left to right as viewed in FIG. 17, from which they are each supported by means of a pair of hooks 403 which engage around a crossbar 416 on each basket. A transfer hook 404 is pivotally secured to the conveyor 402 just ahead of the support hooks 403 and this is used to assist in lowering the baskets 401 down from the conveyor for the trays to be emptied of filled and then raising them up again. The baskets 401 are removed from the conveyor 402 by means of a pair of receiving arms 405 and returned thereto by a pair of elevator arms 406. The arms 405 and 406 are pivoted on shafts 407 and 408 respectively which are rotated by electric motors 409 and 410, the drive from which is in each case transmitted through gearing 411 (FIG. 18) and a lost motion device 412. The lost motion device 412 comprises, as can be seen in FIG. 19, a dogtooth coupling in which one pair of teeth 413 is carried on the shaft 407 (or 408) and a further pair 414 is carried on the gearing 411, the relevant cog of which is otherwise freely rotatable on the shaft 407. The arrangement is such that the two pairs of teeth 413 and 414 intermesh but with a substantial amount of play. This enables the shafts 407 and 408 to move independently of their driving means thereby permitting the arms 405 and 406 to be moved through the topmost part of their travel by the conveyor 402 alone, the motion lost through the device 412 being regained on a subsequent part of their travel.

The baskets 401 are supported on rails 430 which are inclined downwardly to advance the baskets from the receiving arms 405 to the elevator arms 406 and they are indexed tray-by-tray through communication with a tray filler or unloader by means of a conveyor 415.

The hooking and unhooking of the baskets 401 to and from the conveyor 402 is controlled by means which include a cam 417 for each of the pair of hooks 403, which cam is engaged by a follower roller 418 attached to each hook 403 at a point which is in advance of the point 419 of pivoting of each hook 403 and acts to stabilize the movements of the hooks and basket. Each transfer hook 404 is pivoted to the conveyor 402 at 420 and carries a roller 421 which, in one position of the hook 404, can engage in a channel 422.

The operation of the electric motors 409 and 410 is controlled by three striker-actuated switches 423, 424 and 425 and by two cam-controlled switches 426 and 427. Switch 425 is actuated to control switch 423 and the raising of the arms 405 when a basket 401 is advanced by the conveyor 415 to the end position by the elevator arms 406; it also controls switch 428 and the raising of arms 406. Switch 423 has a reading device which examines a code on each basket and is actuated to operate the motor 409, when a basket with the right code comes along. Switch 424 has a striker 428 which is operated to actuate the switch 424 and control the raising of the arms 406 whenever the roller 421 of an unladen transfer hook 404 drops out of the channel 422. The cam-controlled switches 426 and 427 are actuated by cams such as 429 (FIG. 18) carried on the shafts 407, 408 to rotate with the arms 405 and 406 respectively.

The operation of the apparatus shown in FIGS. 17 to 19 will now be described.

Which the tray-filler or tray-unloader is operating on the trays in one basket, no tray exchange is required, there is no basket in a position to actuate switch 425 and all the baskets or empty hooks on the conveyor 402 pass straight through the station.

When the tray-filler or -unloader has dealt with a basket the conveyor 415 moves the baskets along so that the end basket 401 actuates the switch 425. It is also brought into register with the arms 406 for lifting up to the conveyor 402 in due course. Operation of the switch 425 sets up switch 423 so that when a basket with the correct code comes along, the switch 423 is actuated and starts the motor 409 which raises the arms 405 to their full line position. At this point cam switch 426 turns the motor off and the a arms 405 stay nearly vertical until their hooks are engaged by the crossbar 416 of the relevant basket. As they engage, the arms 405 are carried forward to the second chain-dotted position by the conveyor 402, this motion being lost in the device 412. If there were no lost motion device the timing and speed of the motor 409 would have to be very accurately synchronized with the motion of the conveyor 402 and in practice this could cause severe difficulties. The same is true of the operation of the elevator arms 406, which will be described shortly.

At the same time the slowing down of the basket 401 by the arms 405 swings the support hooks 403 out of engagement with the crossbar 416 thereby transferring the weight of the basket to the arms 405. This movement is stabilized by the engagement of the rollers 418 with the cams 417. At this time the roller 421 enters the channel 422 holding the hook 404 up so that further motion of the basket 401 on the arms 405 carries it clear of the transfer hook 404 as well. The basket is now free of the conveyor 401. At the end of the lost motion movement of the arms 405 the cam switch 426 is actuated again and switches the motor 409 on. The motor continues the rotation of the arms 405 setting the basket 401 down the returning to the first chain-dotted rest position.

When a basket comes along that is not required, the rollers 418 on the hooks 403 still strike the cams 417, but because the weight of the basket is not separately supported, the effect is simply to swing the basket and the hooks backwards sufficiently to allow the rollers 418 to pass over the cams 417.

When the free transfer hook 404 which has just unloaded a basket runs out of the channel 422 it actuates the switch 424 starting the motor 410 and raising the elevator arms 406 and a basket thereon to the upright waiting position at which the motor 410 is stopped by switch 427, where the transfer hook 404 catches the crossbar 416. In the subsequent movements, the hook 404 is pulled back by the crossbar 416 and so the support hooks 403 catch on to the crossbar with a cam action, and the basket is drawn forward, together with the arms 406 which go through their lost motion phase, and out of the arms 406 to be carried away on the conveyor 402. At the end of the lost motion, cam switch 427 restarts motor 410 returning the elevator arms 406 to their full line, rest position.

With regard to the operation of the switch 424, in the case of a set of hooks loaded with a basket which is not wanted but is to pass through the station, the roller 421 on the hook 404 runs through the channel 422 but is supported above the striker 428 as it passes out of the channel 422, which in the case of a set of empty hooks coming along, the hook 404 hangs down so that its roller 421 passes below the channel 422 and below the striker 428. Thus the only case where the striker 428 is actuated is when a basket is unloaded on to the receiving arms 405; when this happens the roller 421 is carried into the channel 422, but as it runs out it is free to swing downwards and in doing this it hits the striker 428, actuating the switch 424 and causing the arms 406 to raise a basket to be carried away on the free set of hooks 403 and 404. In this way a basket is only loaded on to a set of hooks which has already delivered a basket to the station.

The exchange of trays between rail 4 and conveyors 6 and 7 in FIG. 1 may be achieved in accordance with any of the embodiments described with reference to FIGS. 2 to 19.

In any of the above examples any well known means may be used for bringing about the specified automatic operations described in the present application. One suitable example is described in the Molins application, Ser. No. 616,263, filed Feb. 15, 1967, now U.S. Pat. No. 3,486,604, granted Dec. 30, 1969, which has the same assignee as the present application.

The exchange of trays between rail 4 and conveyors 6 and 7 in FIG. 1 may be achieved in accordance with any of the embodiments described with reference to FIGS. 2 to 19.

We claim:

1. Mechanical handling apparatus in which loaded and unloaded carriers are exchanged and transported, comprising an overhead conveyor, a plurality of carriages mounted for continuous travel along said conveyor, at least one handling station having an input point and an output point for the carriers positioned below the line of travel of the carriages and spaced therealong, hoist means to lower and raise the carriers between the carriage and the handling station, releasable securing means for securing a carrier to said carriage, said securing means being releasable upon lowering a carrier to said handling station, and control means operative so that said hoist means which has set down a carrier at the input point of a handling station picks up a carrier from the output point of said handling station.

2. Apparatus as claimed in claim 1 wherein said releasable securing means comprises a coupling having parts integral with both said carriage and a carrier for holding the carrier against downward and horizontal movement, said coupling being releasable by imparting upward movement to the carrier part relative to the carriage part and lockable by imparting to the coupling parts relative horizontal movement to one another.

3. Apparatus according to claim 2 wherein said hoist means comprises a transfer member supported on the carriage to assist in locking the coupling and arranged to engage the carrier part in advance of the engagement of the carriage part therewith to provide a connection between the carrier and the carriage prior to the securing together of the coupling parts.

4. A conveyor system comprising an endless conveyor extending between at least one goods-loading station and at least one goods-unloading station and having a forward reach for the transmission of goods-laden containers from the loading station to the unloading station and a return reach for the transmission of empty containers in the opposite direction, and interchange means interconnecting the two reaches, said interchange means comprising means to convey goods-laden containers in the return reach to the forward reach bypassing the loading station and to convey empty containers in the forward reach to the return reach bypassing the unloading station.

5. A conveyor system according to claim 4 wherein the interchange means is provided with means for storing containers.

6. A conveyor system according to claim 4 wherein the interchange means is provided with means for storing and conveying separately goods-laden and empty containers respectively.

7. A conveyor system according to claim 4 wherein the interchange means comprises a first transfer station at the forward reach having on-loading means to receive laden containers from the conveyor and having off-loading means for the discharge of empty containers to the conveyor, a second transfer station at the return reach having on-loading means to receive empty containers from the conveyor and off-loading means for the discharge of laden containers.

8. A conveyor system according to claim 4 comprising a plurality of goods-loading and goods-unloading stations, means to supply different types of goods to the goods-loading stations and means to sort the goods into types at the goods-unloading stations.

9. A conveyor system according to claim 8 comprising carriers for the goods having adjustable coding means, means to set the coding means according to the nature of the goods at the goods-loading stations and means responsive to the set coding to select the carriers according to their coding at the goods-unloading stations.

10. A conveyor system according to claim 4 wherein the conveyor comprises a number of hoists for supporting carriers for the goods, said hoists being mounted for travelling continuously along an overhead closed path, and each on-loading and off-loading station has an input and an output point disposed beneath the conveyor and spaced therealong, and has a receiving device and an elevating transfer device respectively to assist in lowering carriers from the conveyor to the station and in raising them from the station to the conveyor.

11. A conveyor system according to claim 10 comprising means for automatically releasing and lowering a carrier from a hoist to a station and for raising and securing a further carrier from that station to the hoist.

12. A conveyor system according to claim 4 for use in conveying cigarettes from cigarette-making machines to cigarette-packing machines wherein said containers are designed for carrying trays of cigarettes on the conveyor, said goods-loading station comprises a tray-filling machine, supplied with cigarettes from a cigarette-making machine, to feed said trays, and said goods-unloading station comprises a tray unloading machine to receive trays from each goods-unloading station and to feed cigarettes to a cigarette-packing machine.

13. A conveyor system according to claim 4 further comprising control means to regulate the quantity of goods in the interchange means relative to the rate of supply and demand therefor at said loading and unloading stations respectively.

14. Mechanical handling apparatus in which loaded and unloaded carriers are exchanged and transported, comprising an overhead conveyor, at least one carriage mounted for continuous travel along said conveyor, at least one handling station having an input point and an outpoint for the carriers positioned below the line of travel of the carriage and spaced therealong, hoist means to lower and raise the carriers between the carriage and the handling station and releasable securing means for securing a carrier to said carriage, said securing means being releasable upon lowering a carrier to said handling station, said hoist means comprising at least one transfer device arranged to support the carrier and to pivot about an axis transverse to the conveyor for the purpose of guiding the carrier in its movement between the conveyor and the handling station, and said transfer means comprising transfer members mounted for pivotal movement about a point which is stationary relative to the carriage and including means to engage a carrier supported on said carriage.

15. Apparatus according to claim 14 wherein the hoist means derives its power from the movement of the carriage along the conveyor.

16. Apparatus according to claim 15 wherein the hoist means comprises a friction wheel mounted on the carriage and cams positioned relative to the handling station to engage the wheel and cause it to rotate as the hoist means advances along the conveyor and connecting means to connect the friction wheel to the carrier.

17. Apparatus according to claim 16 wherein the connecting means includes a member secured to the friction wheel to rotate therewith and supporting a part of the releasable securing means.

18. Apparatus according to claim 17 wherein the hoist means includes a winch operatively connected with the friction wheel and wherein the securing means comprises a coupling carried on a line wound on the winch.

19. Apparatus according to claim 14 wherein the transfer members comprise arms formed at their ends to be engageable with the carriers.

20. Apparatus according to claim 14 wherein switch means is provided operable by carriers for controlling the power means.

21. Apparatus according to claim 14 comprising transmission means to connect the power means to the transfer members such that for a part of their cycle of movement the transfer members can be advanced other than by the power means and the motion lost in the transmission means.

22. Mechanical handling apparatus in which loaded and unloaded carriers are exchanged and transported, comprising an overhead conveyor, a plurality of carriages mounted for continuous travel along said conveyor, at least one handling station having an input point and an output point for the carriers positioned below the line of travel of the carriages and spaced therealong, hoist means to lower and raise the carriers between the carriage and the handling station, releasable securing means for securing a carrier to said carriage, said securing means being releasable upon lowering a carrier to said handling station, and control means operative so that said hoist means which has set down a carrier at the input point of a handling station picks up a carrier from the output point of said handling station, said hoist means comprising two transfer devices arranged to support the carriers, each said transfer device being pivotable about an axis transverse to the conveyor for the purpose of guiding the carriers in their movement between the conveyor and the handling station, one of said transfer devices being operate between the conveyor and the input point of the handling station and the other of said transfer devices being operative between the conveyor and the output point of the handling station.

23. Apparatus according to claim 22 wherein first transfer members are provided juxtaposed to the input point and movable to a first position to intercept and effect removal from the conveyor of the next carrier and wherein the control means includes a first device responsive to the presence of a carrier at the output point to effect movement of the transfer members to said first position.

24. Apparatus according to claim 23 wherein the carriers are each provided with coding means and wherein the control means includes a selector device response to the carrier codings to time the movement of the transfer members to select a desired carrier.

25. Apparatus according to claim 23 wherein second transfer members are provided juxtaposed to the output point to be movable to a second position with a carrier to intercept the next empty carriage and effect loading of the carrier on to that carriage and wherein the control means includes a second device responsive to the movement towards the output point of an empty carriage that has unloaded its carrier at the input point to effect movement of the second transfer members to said second position.

26. Apparatus according to claim 25 wherein the second device comprises a switch having a striker and actuated by vertical movement of the striker disposed relative to the conveyor between the input and output points, the transfer member being arranged to pass over the striker when the carriage is supporting a carrier, to pass under the striker when the carriage is empty, having arrived empty at the input point, and to actuate the striker by swinging from an upper to a lower position when the carriage is empty, having delivered a carrier at the input point.

27. Mechanical handling apparatus in which loaded and unloaded carriers are exchanged and transported, comprising an overhead conveyor, a plurality of carriages mounted for continuous travel along said conveyor, at least one handling station having an input point and an output point for the carriers positioned below the line of travel of the carriages and spaced therealong, hoist means to lower and raise the carriers between the carriage and the handling station, releasable securing means for securing a carrier to said carriage, said securing means being releasable upon lowering a carrier to said handling station, and means for automatically causing said hoist means to lower and release a carrier and raise a further carrier at said handling station.